US007014681B2

(12) United States Patent
Noack et al.

(10) Patent No.: US 7,014,681 B2
(45) Date of Patent: Mar. 21, 2006

(54) FLEXIBLE AND POROUS MEMBRANES AND ADSORBENTS, AND METHOD FOR THE PRODUCTION THEREOF

(75) Inventors: Andreas Noack, Jungstuck (DE); Jurgen Kunstmann, Bad Soden (DE); Gerald Frank, Dreieich (DE); Christian Gnabs, Kelkheim (DE); Norman Bischofberger, Wiesbaden (DE); Andreas Bán, Koblenz (DE)

(73) Assignee: Blue Membranes GmbH, Wiesbaden (DE)

( * ) Notice: Subject to any disclaimer, the term of this patent is extended or adjusted under 35 U.S.C. 154(b) by 123 days.

(21) Appl. No.: 10/399,636

(22) PCT Filed: Oct. 19, 2001

(86) PCT No.: PCT/EP01/12131

§ 371 (c)(1),
(2), (4) Date: Oct. 9, 2003

(87) PCT Pub. No.: WO02/32558

PCT Pub. Date:Apr. 25, 2002

(65) Prior Publication Data

US 2005/0067346 A1 Mar. 31, 2005

(30) Foreign Application Priority Data

Oct. 19, 2000 (DE) ................................ 100 51 910

(51) Int. Cl.
*B01D 53/22* (2006.01)
*B01D 53/04* (2006.01)

(52) U.S. Cl. ....................... 95/54; 95/45; 95/55; 96/11; 55/524; 55/DIG. 5

(58) Field of Classification Search .............. 95/45–56; 96/4–14; 55/524, DIG. 5
See application file for complete search history.

(56) References Cited

U.S. PATENT DOCUMENTS

| | | | |
|---|---|---|---|
| 3,033,187 A | 5/1962 | Wespi et al. .................... 125/11 |
| 3,446,593 A | 5/1969 | Moutaud et al. ............. 23/209.1 |
| 4,640,901 A * | 2/1987 | Lee et al. ........................ 501/81 |
| 4,699,892 A | 10/1987 | Suzuki ............................ 502/4 |
| 4,759,977 A | 7/1988 | Fukuda et al. ................ 428/283 |
| 5,431,864 A * | 7/1995 | Rao et al. .................... 264/29.5 |
| 5,695,818 A | 12/1997 | Soffer et al. .............. 427/248.1 |
| 5,810,912 A * | 9/1998 | Akiyama et al. ............... 96/11 |
| 5,925,591 A | 7/1999 | Soffer et al. ................. 502/426 |
| 5,972,079 A * | 10/1999 | Foley et al. ..................... 96/11 |
| 6,004,374 A * | 12/1999 | Rao et al. ........................ 95/52 |
| 6,117,328 A * | 9/2000 | Sikdar et al. ................ 210/640 |
| 6,395,066 B1 * | 5/2002 | Tanihara et al. ................ 95/47 |
| 6,527,827 B1 | 3/2003 | Noack ............................ 95/45 |
| 6,719,147 B1 * | 4/2004 | Strano et al. ................ 210/490 |
| 2002/0002903 A1 * | 1/2002 | Noack ............................ 95/45 |
| 2002/0033096 A1 * | 3/2002 | Koros et al. .................... 95/51 |
| 2002/0053284 A1 * | 5/2002 | Koros et al. .................... 95/51 |
| 2002/0056369 A1 * | 5/2002 | Koros et al. .................... 95/51 |
| 2003/0101866 A1 | 6/2003 | Noack ............................ 95/45 |
| 2003/0213365 A1 * | 11/2003 | Jantsch et al. .................. 96/11 |

FOREIGN PATENT DOCUMENTS

| | | |
|---|---|---|
| EP | 0 428 052 B1 | 1/1998 |
| JP | 5-194056 | 8/1993 |
| JP | 61-12918 | 1/1998 |
| JP | 11-240779 | 9/1999 |
| WO | 00/24500 | 5/2000 |

OTHER PUBLICATIONS

Database WPI, Section Ch, Week 199952, Derwent Publications Ltd., London, GB; AN 1999-603671 XP002184573, & JP 11 240779 A (Tokai Carbon KK), Sep. 7, 1999. Abstract.

Database WPI, Section Ch, Week 199335, Derwent Publications Ltd., London, GB; AN 1993-278112 XP002184574, & JP 05 194056 A (Oji Paper Co.) Aug. 03, 1993. Abstract.

Database WPI, Section Ch, Week 198609, Derwent Publications Ltd., London, GB; AN 1986-059869 XP002184575, & JP 61 012918 A (Oji Paper Co.) Jan. 21, 1986. Abstract.

* cited by examiner

*Primary Examiner*—Robert H. Spitzer
(74) *Attorney, Agent, or Firm*—Vidas, Arrett & Steinkraus

(57) ABSTRACT

The invention relates to a method for producing flexible and porous adsorbents based on oxidic and/or non-oxidic ceramic material containing carbon. The inventive method is characterized by the following steps: (a) producing a flat base matrix whose constituents are held together essentially by hydrogen bridge bonds, on a machine suited for producing paper; (b) applying and/or impregnating the surface of the base matrix, on one or both sides, with polymeric addition agents; (c) treating the base matrix under pyrolysis conditions at an increased temperature in an atmosphere containing essentially no oxygen. The invention also relates to membranes that can be produced according to the aforementioned method, to flexible material that can be produced by using these membranes, and to their use for separating and purifying fluids.

19 Claims, 2 Drawing Sheets

FLEXIBLE AND POROUS MEMBRANES AND ADSORBENTS, AND METHOD FOR THE PRODUCTION THEREOF

The present invention relates to flexible, porous membranes and adsorbents for use in gas separation methods and the like, methods for their preparation and porous, flexible membranes which can be prepared therewith.

Liquid, gaseous and vaporous fluid mixtures may be separated through membranes. Hereby, at least one component of the fluid mixture is retained by the membrane and is led away as the so-called retentate, whereas at least one other component of the fluid mixture is able to permeate through the membrane and to appear on the other side of this membrane as permeate and to be led away.

Depending on the type of the substance mixture to be separated, membrane materials of various kinds are used. These comprise high molecular weight natural products which have mostly been prepared to be suitable for the separation task, synthetic polymers and special materials, such as cellulose acetate, -butyrate and -nitrate, polyamide, polysulfone, vinyl polymers, polyesters, polyolefines and PTFE, as well as porous glass or glass ceramics, graphite oxide, polyelectrolyte complexes and more of the like.

Apart from the symmetrical membranes (membrane thickness mostly 10–100 $\mu$m) which have the same structure on both sides, asymmetrical membranes made of a thin, active separating layer (active layer thickness mostly smaller than 0.1–10 $\mu$m) on a highly porous carrier layer which supports and stabilizes the system and which does not affect the substance transport (support layer thickness approx. 30–350 $\mu$m), have especially become increasingly important. Thus, asymmetrical membrane systems are used in most of the industrially employed membrane separation procedures. An advantage of the thin separating layer is the low substance transport resistance, which markedly increases the permeate flow compared to symmetrical membranes. Regarding asymmetrical membranes, a distinction is drawn between phase inversion membranes, where separating and carrier layers consist of the same material, and composite membranes, where materials of the layers are chosen differently and are joined to each other.

Especially for gas separation, and here primarily for the technically lucrative separation of oxygen and nitrogen from air, various asymmetrical membrane systems are known in the art. EP 428 052 describes a semipermeable composite membrane consisting of a thin porous substrate covered with a porous adsorption material. For its preparation, polymer latex is applied to a suitable substrate material, such as graphite, and is then carbonized at higher temperature in an inert atmosphere. The membrane polymer precursors described in EP 428 052 comprise polyvinylidene chloride, polyvinyl chloride, polyacryl nitrile, styrene divinylbenzene copolymer and mixtures thereof. The resulting composite membranes have a thickness of up to 3 mm.

The basic problem of such composite systems is the formation of cracks or the low adhesion of ceramic membranes or polymer materials to the carrier materials during manufacture of these systems, especially, when high packing densities are to be achieved. Polymer films on ceramic carriers shrink during carbonization and cracks are generated. Due to their lack of stability, the carrier materials often do not withstand the high compression required to improve the adhesion.

U.S. Pat. No. 3,033,187 describes porous membranes which are produced by the deposition of metal oxide particles into the pores of a sintered porous metallic carrier.

U.S. Pat. No. 4,699,892 describes asymmetrical composite membranes with an ultrathin zeolite layer on porous crier substrates.

U.S. Pat. No. 5,695,818 describes asymmetrical membranes based on carbon, where symmetrical hollow fiber membranes are pore-modified with CVD methods.

WO 00/24500 discloses molding paddings made of charcoal which are modified on the surface to give asymmetrical carrier membranes by CVD methods.

U.S. Pat. No. 5,925,591 describes a method for production of symmetrical carbon membranes consisting of hollow carbon fibers. For this, ordered bundles of hollow cellulose fibers are pyrolyzed after water removal at an increased temperature, Lewis acid catalysts being added during pyrolysis. The described fiber bundle membranes have a length of up to 1 m.

However, the cited carbon fiber membranes were found to be problematic since they require elaborate instrumentation to achieve a homogenous carbonization of the bundled cellulose fibers.

The symmetrical membranes from the state of the art have the disadvantage of building up excessive resistance to substance transport due to their thickness, which compromises the economic efficiency of the separations.

On the other hand, there is a demand for membranes and membrane carriers which can be produced easily and cost-effectively, as well as for an appropriate method for their production which could be used with high separation effectiveness for various fluid separation tests, combining the advantages of symmetrical and asymmetrical membranes.

It is therefore an object of the present invention to provide flexible membrane materials, overcoming the disadvantages of the state of the art. It is especially an object of the present invention to provide membranes and membrane carriers with high packing densities and at the same time with optimal flow profiles, which do not necessarily require a carrier despite their low thickness and low substance transport resistance.

A further object of the present invention is the provision of a production method for thin, planar, stable and flexible materials, which allows for the elaborate and precise production of membranes with defined substance separation properties.

The named objects are solved by the independent method and product claims. Preferred embodiments result from combination with the features of the dependent subclaims.

BRIEF DESCRIPTION OF DRAWING FIGURES

PRODUCTION METHOD

Figure 1:
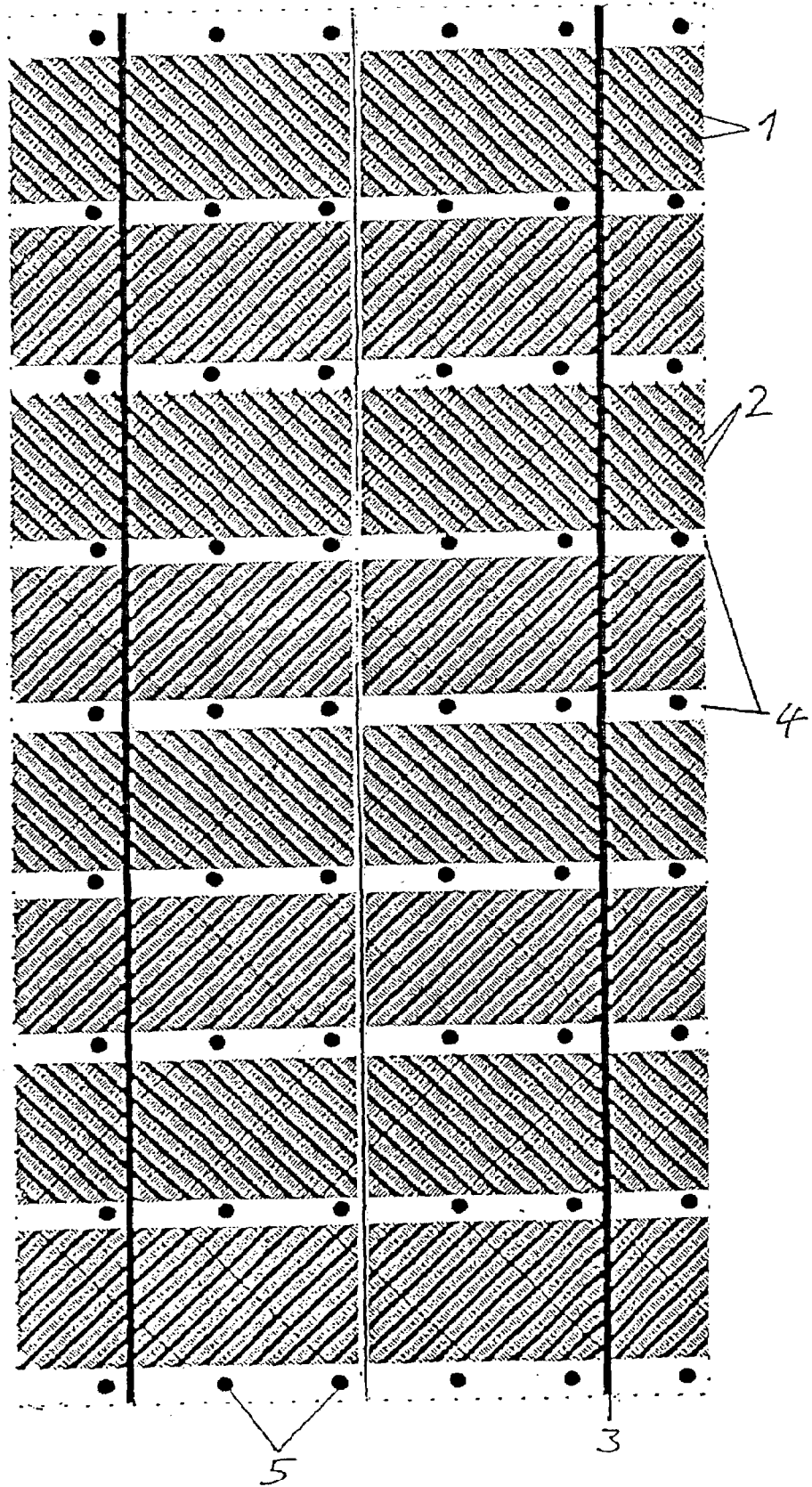
FIG. 1 shows a paper sheet embossed onto one side using a embossing roller and useable according to the present invention.

The method-related object of the invention is solved by a method for production of flexible and porous adsorbents based on oxidic and/or non-oxidic ceramics including carbon, characterized by the following steps:
a) Production of a planar basic matrix, the contents of which are kept together essentially by hydrogen bonds, on a machine suitable for paper production.

b) Application and/or impregnation of polymeric additives on one or two sides of the surface of the basic matrix.

c) Treatment of the basic matrix under pyrolytic conditions at increased temperature in an atmosphere that is essentially oxygen-free.

Surprisingly it has been found that flexible, stable, porous materials can be generated in this way, which are excellently suitable as membrane carriers, membranes and molecular sieves in suitable devices for separation and purification of fluids, especially gases. The membrane materials according to the invention combine the advantages of the symmetrical membrane (simple construction and production) with those of the asymmetrical membrane (low substance transport resistance, good stability). Furthermore, they are characterized by high porosity, high mechanical stability, resistance to corrosion from aggressive media, good flexibility, high temperature stability and high micro-accuracy as well as good adhesion properties.

By pyrolysis of a planar, especially paper-like, basic matrix, especially made of polymeric, fiber-containing materials, under exclusion of oxygen at increased temperatures, if necessary with subsequent pore modification by chemical vapor deposition (CVD) of volatile ceramic precursors or hydrocarbon compounds, self-rigid, self-supporting membrane systems can be obtained in a simple way.

The planar basic matrix used according to the invention is generated on a paper machine from components which are kept together essentially by hydrogen bonds. Using paper-like materials generated on paper and paper processing machines, very thin structures can be obtained which are at the same time very stable, and which eventually allow for high packing densities of the final material.

Planar according to this invention means that two dimensions of the material are on average 5 times as great as the third dimension.

Fiber substances of all kinds, paper-forming fiber materials and the like, e.g. made of carbohydrates in general and also of cellulose-containing materials such as cardboard, paperboard, wood, plants and/or their parts, cotton, linen, fabrics and/or tissues made of cotton and/or linen or similar cellulose-containing materials as well as any other items based on cellulose, can be used for example as starting materials. Preferred according to the invention is the use of paper, especially of carbon paper which contains charcoal black and/or charcoal fibers as filler.

Especially suitable according to the invention are basic matrix materials consisting essentially of natural, semisynthetic and/or synthetic fiber substances. The fiber substances provide sufficient porosity during the packing occurring during pyrolysis/carbonization.

Suitable natural fiber substances comprise cellulose, amylose, starch, polyoses, lignins, flax, hemp, jute, sisal, coco, kenaf, ramie, roselle, sunn, urena, linen, cotton, kapok as well as fibers from corn straw, alfa or esparto grass, fique, henequen, manila, phormium, bagasse, linters, abaka, pine fibers and the like.

Suitable semisynthetic fiber substances are selected from cellulose sulfate, cellulose sulfite, cellulose bicarbonate, cellulose derivatives such as cellulose esters and ethers, cellulose acetate, alginate, viscose, copper silk, polyisoprenes and the like.

Suitable synthetic fiber substances are selected from homo- and copolymers of polyacrylonitrile, polyvinyl alcohol, polyethylene, polypropylene, polyamide, polyester, polyurethane and the like.

In a preferred embodiment of the method according to the invention, the basic matrix consists of a paper selected from hand-made paper, printing paper, filter paper, blotting paper, wood-free paper, wood-containing paper, kraft paper, crepe paper, cardboard paper, paperboard paper, LWC paper, oil paper, overlay paper, packing paper, recycled paper, synthetic fiber paper, tissue and the like.

Especially suitable are papers with a volume-related surface of at least 1,000 $m^2/m^3$, preferably 10,000 $m^2/m^3$, and especially preferably of 20,000 $m^2/m^3$.

Equally suitable, however, are cotton fabrics and tissues or the like.

It is particularly preferred that the basic matrix, especially one made of paper, comprises additives made of paper-forming fiber materials, glass fibers, carbon fibers, plastic fibers, carbon nanotubles (single and/or multi wall), fullerenes, metal fibers and powders, asbestos, rock wool fibers, quartz fibers, powder fillers such as carbon black, kaolins, aluminium oxides, silicon oxides, zeolites, charcoal powder, pereskovites, tar pitch and the like. Additives such as sand, cement, glass fibers, especially, however, carbon additives such as carbon black, charcoal black, tar pitch powder, carbon fibers and/or the like are particularly preferred. Carbon fibers in the paper increase breakage stability and flexibility of the resulting membranes or carbon materials, whereas charcoal black and the like act as seed crystals in the subsequent CVD processing steps, and allow for control of the membrane porosity during the manufacturing process.

For production of self-supporting, self-rigid membranes according to the invention, carbon paper containing up to approx. 50 percent per weight, preferably 1–50 percent per weight, charcoal black as filler, is used preferably. Especially preferred is the use of charcoal black with high BET surfaces of at least 200 $m^2/g$, preferably at least 500 $m^2/g$.

In order to suitably control permeate flows during operation of a self-supporting, self-rigid membrane according to the invention and to optimize their flow profile, it is preferred in a preferred embodiment to provide the employed basic matrix with am embossing structure prior to carbonization, e.g. with a groove, row or web structure, preferably with a groove structure in the form of parallel grooves. When the paper is folded afterwards, the grooves that lie on top of each other form defined channels to lead the flow away, allowing for optimal turbulence of the fluids on the feed side of the membrane and for fast substance exchange on the permeate side. However, depending on the form of the material to be pyrolyzed and the intended use of the membrane, any other surface structures may be applied, e.g. drilled holes, dents, nubs and the like, which the skilled person will choose according to the form of the membrane.

For carbon paper, which is especially preferred according to the invention, the embossing of diagonal grooves spaced apart approx. 100 nm on the carbon paper, either one-sided or on both sides on the paper sheet, is especially advantageous, however, corresponding embossments may be implemented on any other paper materials as well. Especially preferred is a structural embossment on the permeate side, which can be generated using embossing techniques known to the expert, e.g. roll embossing.

In an especially preferred embodiment of the invention, a polymer film and additionally a thin film of carbon black is applied on one side or both sides of the fiber-containing basic matrix, being pressed into the material for example using a calendering machine. Preferably, the carbon black film is applied to the subsequent feed side of the membrane, whereby carbon black with a BET surface of at least 500 $m^2/g$ is used.

The polymer film applied to one or both sides of the surface of the basic matrix comprises polymeric additives which are selected from polyethylene, polypropylene, polycarbonate, polyethylene terephthalate, polystyrene, polyamide, polyacrylate, phenol resin, epoxide resin, novolac resin, siloxane, tar pitch, bitumen, rubber-, polychloroprene or poly(styrene-co-butadiene)-latex materials and the like, as well as any mixtures thereof. Application can be performed by impregnation and/or coating of the basic matrix on one or both sides.

Apart from carbon black, other powder-like, sheet-like or fiber-like materials can be applied to a polymer-coated or impregnated basic matrix on one or both sides. These materials for example comprise activated carbon black, carbon nanotubules (single and/or multi wall), fullerenes, carbon fibers, charcoal fibers, charcoal powder, carbon molecular sieve, perowskites, aluminium oxides, silicon oxides, SiC, BN, noble metal powder of Pt, Pd, Au or Ag.

To control the packing process during the carbonizing step, it is further preferred according to the invention to impregnate any embossed or structured starting material with a suitable adhesive and to dry or cure it prior to carbonization if necessary. Here, the adhesive is preferably characterized by contraction during the drying process and inducing shrinkage of the paper. For this, the paper is pre-clamped like a spring, compensating for the natural shrinkage during the packing process occurring in the oven process during carbonization. In combination for example with embossed carbon paper, it is thus possible to let the paper shrink perpendicularly to its groove structure during drying by use of a suitable adhesive.

Suitable adhesives are those which preferably begin to melt and to exhibit adhesive properties at approx. 50° C. and leave as high as possible a proportion of C structures in the following pyrolysis process. Examples for this are tar pitch, tar pitch powder, so-called hot melting adhesives based on EVA, SBS, SEBS, etc., phenolic resin or foam adhesives with a high carbon content, such as Prestodur® PU55.

Furthermore, it can be advantageous and it is preferred according to the invention to print a catalytically active metal on one or both sides of the item, preferably only on the side of the membrane which is subsequently permeate, on the margins and sealing surfaces, which controls a targeted carbon waxing process in the downstream CVD/VCI process and thus allows for a sealing of the membrane at its margins. Suitable metals are salts and compounds of transition metals such as iron, cobalt, nickel, chromium, as well as especially their oxides.

However, such a margin seal may be fully dispensed with if the membrane is incorporated in a separating device, for example in correspondingly fitted tight frame constructions.

The cellulose-containing material may be preformed prior to carbonization depending on the constructive demands. Therefore for example, paper or cardboard can be folded or pleated as desired, and this form can then be fixed in the method according to the invention. The folding may be performed with the usual methods that are well known to the expert.

Furthermore, it is possible to implement electrically isolated areas in the membrane bodies according to the invention by suitably choosing the basic matrix materials or the construction of the basic matrix.

In a preferred embodiment, an embossed paper, coated with polymeric additives and/or adhesive, is folded using a rotational folding machine or a knife folding machine, and is then conditioned at tightest packing. Optionally, every fold is pressed together with a suitable tool at the sealing areas (longitudinal bands), and is provided with an additional embossment which aids in holding the fold together. Furthermore, the individual folds may be glued together in a suitable way, so that the embossed structures in the folded arrangement are situated on top of each other, so that channels form between two fold layers. Preferably, the folding is performed in such way that a surface volume of the paper-like material of at least 50 $m^2/m^3$, preferably 500 $m^2/m^3$, results. Furthermore, an average fold distance of less than 15 mm is preferred, especially of less than 5 mm, especially preferred between 5 $\mu$m and 5 mm.

The preferred average fold density of membranes or membrane carriers according to the invention is 100 to 10,000 folds per meter.

In a preferred embodiment of the invention, tempering prior to pyrolysis is performed at increased temperatures in order to decrease tensions. The preferred temperature is above room temperature, especially between 30 and 200° C.

Pyrolysis or carbonization in procedure step c) of the, if necessary, structured, pre-treated, pre-shrunk and/or preformed material is conducted in a suitable oven at increased temperatures, if possible largely under oxygen exclusion. This can occur with a substantially oxygen-free inert gas either in a static atmosphere or, preferably, in an inert gas flow. Pyrolysis in negative pressure or vacuum is also possible according to the invention.

By treating the fiber-containing basic matrix at temperatures in the range of 200–1000° C. with exclusion of oxygen, the carbon-containing fiber structure is carbonized pyrolytically, and transformed to an essentially pure carbon structure, with packing of the material occurring usually. By controlling the temperature profile during pyrolysis, this packing process can be controlled, so that a carbon body with defined pore structure and porosity is obtained. Generally, with decreasing pyrolysis temperatures the carbonized body becomes more porous but also mechanically less stable. Vice versa, baking of the carbon scaffold occurs when the pyrolysis temperature is too high, giving rise to compact, highly dense, briquette-like structures with only little or no porosity.

Adsorption effects, pore condensation effects and chemisorption on the impregnated and non-impregnated carbon membranes lead to a multitude of permeation modes, possibly leading to unexpected permeation selectivities. Especially with a pore radius between 5 and 15 Å, effects occur primarily at (metal)-impregnated carbon membranes, which allow for the preferred permeation of the larger molecule through the membrane pores.

According to the invention, the fiber-containing basic matrix is carbonized during pyrolysis under protective gas and/or in the vacuum at temperatures of 200 to 1000° C., preferably of 250 to 500° C. Suitable protective gases comprise nitrogen, noble gases such as argon, as well as all other inert gases and gas compounds not reacting with carbon.

If necessary, it is preferred to apply the fiber-containing basic matrix to suitable devices before carbonization, which allow for a suction of the resulting pyrolysis gases through the material to be pyrolyzed. For this, the material may be applied for example to porous bodies with a central flow/suction channel, which can be connected to a vacuum during pyrolysis. It is advantageous that decomposition gases that are liberated during pyrolysis, in part in a local conflagration, can be dissipated fast and efficiently in a single direction, so that a local rupture of the membrane surface is avoided.

Furthermore, this has the advantage that the precursor gases can be suctioned in a defined preferred direction through the resulting membrane elements in the subsequent CVD/CVI step, enabling an additional controlling of the local selectivity of the separation.

The pyrolysis step is performed preferably in a continuous oven process. On the one end, the basic matrix, which is pre-treated and folded if necessary, is added to the oven, and the stable membrane is removed from the oven at the other end. It is especially preferred that the items to be pyrolyzed are positioned in the oven on a surface with holes or the like, which allows negative pressure to be applied from the downside.

This allows in a simple way a fixation of the items in the oven as well as suction and optimal inert gas flow through the parts during pyrolyses. The oven may be segmented correspondingly by inert gas locks, in which the steps of pyrolysis/carbonization, CVD/CVI process (optional procedural step), and, if necessary, further post-treatment steps such as post-activation/-oxidation or metal impregnation occur subsequently.

Alternatively, the pyrolysis may also be performed in a closed oven, which is especially preferred when the pyrolysis is to be performed in the vacuum.

During the pyrolysis a weight decrease of approx. 50–90%, preferably approx. 80%, generally occurs, depending on the used starting material and pretreatment. Furthermore, there is shrinkage of the basic matrix in the range of 0–60%, preferably of approx. 0–20%.

After pyrolysis, the materials according to the invention are characterized by the shrinkage of a membrane/basic membrane, according to the invention being max. 5%, preferably max. 1%, when heated in an inert atmosphere from 20° C. to 600° C. and then cooled to 20° C. The weight loss of basic matrix bodies which are folded correspondingly after being heated again to 600° C. is max. 10 percent per weight (after predrying).

It is essential for the method according to the invention, that the pyrolysis during the carbonization step is preferably complete, i.e. the fiber substances are transformed almost completely into carbon or basic ceramics together with the other components of the starting material. The membranes according to the invention have a carbon content of at least 50 percent per weight, for membranes based mainly on carbon at least 90 percent per weight.

In a particularly preferred embodiment, alkali or earth alkali metal salts are incorporated in the basic matrix, which can be removed again after pyrolysis or after CVD/CVI using water or aqueous acids, which creates additional porosity.

If necessary, the carbonized material may then be subjected to a so-called CVD process (chemical vapour deposition) in a further optional processing step. For this, the carbonized material is treated with suitable precursor gases at high temperatures. Such methods have long since been known in the art.

As carbon-cleaving precursors almost all known, saturated and non-saturated hydrocarbons can be considered with sufficient fluid under CVD conditions. Examples are methane, ethane, ethylene, acetylene, linear and branched alkanes, alkenes and alkynes with carbon numbers of $C_1$–$C_{20}$, aromatic hydrocarbons such as benzene, naphthalene, etc., as well as mono- and polysaturated alkyl-, alkenyl- and alkynyl-substituted aromatics such as toluene, xylene, cresol, styrene, etc.

As ceramic precursors, $BCl_3$, $NH_3$, silanes such as tetraethoxysilane (TEOS), $SiH_4$, dichlorodimethylsilane (DDS), methyltrichlorosilane (TDADB), hexadichloromethyl syloxide (HDMSO), $AlCl_3$, $TiCl_3$ or mixtures thereof, may be used.

These precursors are used in CVD methods mostly in low concentrations of approx. 0.5 to 15 percent per volume mixed with an inert gas such as nitrogen, argon or the like. The addition of hydrogen to corresponding deposition gas mixtures is possible as well. At temperatures between 500 and 2,000° C., preferably between 500 and 1,500° C., and particularly preferred between 700 and 1,300° C., the named compounds eliminate hydrocarbon fragments or carbon or ceramic precursors, which deposit essentially evenly in the pore system of the pyrolysed material, modifying the pore structure, and therefore lead to a substantially homogenous pore size and pore distribution in the sense of further optimization.

For control of the even distribution of the deposited carbon particles in the pore system of the carbonized item, a pressure gradient may be applied for example during deposition of the carbon precursor at a surface of the carbonized item, e.g. in form of a continuous negative pressure or vacuum, by which the deposited carbon particles are sucked evenly into the pore structure of the carbonized substance (so-called forced flow CVI, chemical vapour filtration; see e.g. W. Benzinger et al., Carbon 1996, 34, page 1465). The resulting homogenization of the pore structure increases the mechanical stability of the self-supporting membrane.

This procedure may be employed also with ceramic precursors in an analogous way.

During the CVD/CVI process, there is usually a 0.1–30-fold increase of weight compared to the weight of the carbonized material. Especially preferred, carbon deposition occurs at a 0.5–10-fold increase in weight.

During the CVD/CVI process, volatile transition metal compounds such as iron, cobalt or nickel carbonyls may be added to the depositing gas mixture, and it has been observed that these metals deposit more in the large pores, and here catalyze an accelerated CVD growth. This leads to a further improvement in the pore size homogeneity.

After this three-step process, the geometry of the pore system can be modified or custom-fit in a further post-treatment step by targeted oxidation using air, hydrogen vapour, carbon dioxide, nitrogen oxides or the like during the cooling process. A post-activation with $H_2O$ vapour, $CO_2$ or $O_2$-separating gases (such as $NO_x$) generally occurs at temperatures between 600 and 1,200° C., preferably of 800 to 1,000° C. Post-activation with air generally takes place at temperatures of 100–800° C., preferably of 250 to 500° C.

The post-activation gases may hereby be present in pure form or diluted with inert gas. Preferably, the post-activation is performed in a segment of a continuous oven process.

In a particularly preferred embodiment, the finished membrane or the catalyst carrier is finally treated with transition metals such as Pd, Pt, Ir, Rh, Co, Ni, Fe, Au, Ag, Cu, Mn, Mo, W, etc. This is done in a simple way by impregnating the carrier with the corresponding metal salt solutions and subsequent drying under protective gas or in a reducing atmosphere. This post-treatment allows for modification of individual permeation selectivities or implementation of species to prevent contamination on the carrier surface.

Furthermore, the impregnation with transition metals induces catalytic properties of the membrane, so that they are able to chemisorb and permeate hydrogen especially well.

Membrane

The resulting self-supporting, self-rigid membrane elements have a homogenous pore structure. Furthermore, the membranes according to the invention are mechanically stable and can be custom-fit to almost any fluid separation tasks. The method according to the invention allows for the production of stable, self-rigid membrane systems which can be adjusted with defined pore structures by variation of simple process parameters for almost any application purposes in the area of fluid separation.

This is based on the elimination of the assembly's flexibility by pyrolytic welding of folded, a priori flexible materials to favour self-rigidity. The end material is suitable for technical application criteria if a force of approx. 0.1 N/cm$^2$ can act from above onto the folds assembly without noticeable yielding of the material. The term "self-rigidity" is to be understood in the present invention in this respect: At a weight load of 1 kg/100 cm$^2$ membrane surface, a deformation of less than 1% occurs, i.e. the membranes/carriers according to the invention resist a surface pressure of approx. 0.1 N/cm$^2$.

The pyrolysis and any downstream CVD/CVI process are controlled via the temperature and the atmospheric conditions in a suitable way, so that the self-rigid membranes produced according to the invention have porosity and an average pore size which are optimal for the desired fluid separation task. The BET surfaces (adsorption of $N_2$, $-196°$ C.) of membranes produced according to the invention are in the range of at least 2 m$^2$/g, preferably at least 50 m$^2$/g, and especially preferred at least 100 to 200 m$^2$/g.

Using the method according to the invention membranes can be obtained that have unique porosities and pore volumes especially because of the embossing and folding of the used basic matrix. In the membrane packages produced according to the invention, between 20 and 80 vol. %, preferably between 30 and 70 vol. %, especially preferably between 40 and 60 vol. % of the special volume of the membrane package are formed by transport pores with diameters between 400 μm and 5 μm, preferably between 300μ and 10μ. These pore volumes and diameters can be determined by Hg porosimetry in known fashion. Transport pores in membranes and membrane packages according to the invention are characterized by being re-exposed in solvent-filled state by short-term centrifugation (16 g, 1 min) to a level of at least 30%, preferably at least 50%, especially preferably to 70% of the pore volume. For this, the membrane which is saturated with carbon tetrachloride and included in a container saturated with carbon tetrachloride is allowed to drip off for two minutes, and is then centrifuged again in a carbon tetrachloride-saturated atmosphere in a centrifugal field with 16 g=157 m/s$^2$ for 1 min. Then, the amount of carbon tetrachloride maintained in the pore system is determined gravimetrically.

In an especially preferred embodiment the finished membrane is dimensioned so that the two-dimensional projection of the homogenous membrane body has a surface of at least 5 cm$^2$ (length by width), with min. dimensions of 1 cm each for the length and width.

The macroporous membrane bodies that are obtained according to the invention by folding of the basic matrix before pyrolysis, have a light permeability of less than 1% perpendicular to the inflow surface at 5 cm body depth and using blue light with a wave length of 460–480 nm.

The application area of membranes according to the invention is relatively wide, since by simple adjustment of the production conditions and the selection of the starting material membranes with defined composition, structure and property profile can be custom-fit easily. Membranes according to the invention may therefore be used for the separation of gases, for example the separation of oxygen and nitrogen from air, the separation of hydrogen from process gases, the enrichment of any gas from complex gas mixtures as well as the separation of chlorofluorocarbons and various isotopes. Especially preferred is the use of membranes/membrane carriers and adsorbents according to the invention in suitable devices for enrichment of the oxygen content of the interior air.

The membranes according to the invention may be also used in fluid phase, for example for purification of water, separation of salts from aqueous solutions, etc.

The membranes according to the invention may be easily fabricated from the simplest starting materials and are characterized by high mechanic stability, defined pore structure and high chemical durability. They may be fitted into a plurality of special arrangements in membrane separation devices, whereby they may be used either self-rigidly as a symmetrical membrane, or may be additionally stabilized analogously by application to suitable carrier materials and used like asymmetrical membranes.

Membrane Carriers/Catalyst Carriers/Carbon Black Filters

According to the method according to the invention, elements can be fabricated which are suitable also as membrane carriers or catalyst carriers or carbon black filters, consisting mainly of silicon carbide, aluminium oxide and silicon oxide.

For this, only the corresponding suitable starting material for the basic matrix has to be selected, i.e. silicon- or aluminium-containing compounds apart from the described carbon compounds.

Especially for fabrication of SiC-containing carriers or filters Si-containing compounds such as optical fibers, silicon oxides, silicates, silica as well as especially monomeric, oligomeric and polymeric organosilicon compounds such as organosilanols, organosilanes, organohalogen silanes as well as organosubstituted siloxanes, silazines, silathianes, carbosilanes, silicones, silicides, any mixtures of the previously mentioned and the like can be used as basic matrix materials.

For production of SiC-containing materials, it may be necessary to increase the pyrolysis temperature to 1000° C. to 3500° C., preferably 1500° C. to 3000° C. and especially preferably 2000° C. to 2500° C.

Fluid Separation Device

Using membranes fabricated according to the invention on the basis of a folded basic matrix, highly efficient fluid separation devices can be constructed. These are similar to an artificial tree packed in a space as dense as possible, the membrane elements representing the leaves. The membrane elements which are folded like Sulzer packages have fold heights of 1 cm to 1 m and embossed flow channels with a diameter of up to 10 mm. The folds distance is 1 cm to 20 μm. The arrangement of the membranes is such that the feed and the permeate are directed to each other in a cross-flow.

The membranes can be heated either on the feed side or on the permeate side to accelerate the substance transport.

Preferred fluid separation devices are constructed in the form of a membrane module, the membrane element being housed in such way that the targeted flow-through of the membrane body parallel to the folding is enabled, and the bottom side of the membrane element is brought onto a porous support and is essentially sealed at the margin, and whereby connections for leading the permeate away are attached to the support.

The flow characteristics in such a membrane module according to the invention are such that, with a pressure gradient between feed and retentate of 1 bar/m flow-through length and a decreased pressure in the permeate, based on the arithmetic mean of 0.5 bar of the pressure between feed and retentate, the module causes a permeate/retentate ratio of <10% in the dried and degassed state, overlaid with $N_2$, and that when overlaid with $H_2$ and equal pressure conditions the absolute permeate flow is increased by a factor of at least 10 based on the nitrogen permeate flow, and that when overlaid with $SF_6$ and equal pressure conditions the absolute permeate flow is decreased by a factor of at least 10 based on the nitrogen permeate flow.

With corresponding fluid separation devices, $O_2$ delivery rates of 50 l/h up to 200 m$^3$/h can be achieved in the oxygen enrichment of the interior air if the expert provides suitable membrane dimensions.

With a membrane module according to the invention with the dimensions 30×30×50 cm (h×w×d), for example air with an $O_2$-content of 52 vol % can be produced per hour when overlaid with air and a negative pressure of 800 mbar.

Carbon and Ceramics Material

Furthermore, the carbon and ceramic material, of which the membranes fabricated according to the invention consist, have unique properties. Carbon and ceramic material fabricated according to the method according to the invention is characterized by a surprising flexibility. Mechanically pulverized carbon and ceramic material fabricated according to the method according to the invention demonstrate as bulk material a significant rebound effect in contrast to conventional charcoal, if a suitable body is dropped on to the bulk.

This flexibility of the carbon and ceramic material according to the invention, which is caused by a structure with especially few flaws, is the reason for the superior substance separation properties of these materials: After all, no membranes are known in nature which are not also flexible, such as skin or leaf membranes.

For determination of the flexibility of the material according to the invention, the material which has been mechanically pulverized in a suitable manner is converted into standardized bulk material fractions by sieving. For further characterization, the 10×18 US-mesh (2.00×1.00 mm) sieve fraction (1–2 mm) and/or the 20×40 US-mesh (0.85×0.425 mm) sieve fraction can be selected. Furthermore, the sieved material is treated for standardization and purification of adsorbed species in methylene chloride for one hour under reflux conditions, is then dried, and boiled for another hour in 10% aqueous hydrochloric acid solution under reflux, and dried at 80° C. to a residual water content of under 1%.

Dynamic Flexibility According to Downpipe Test

For determination of the dynamic flexibility, an as tightly as possible packed bulk of 2.5 g pretreated as above described material according to the invention is provided in a vertically positioned, clear plexiglas downpipe with an internal diameter of 21 mm and a height of 1000 mm. For this, the bulk material is vibrated evenly and slowly over a vibrating rail in 15 seconds into the down pipe, which results in a homogenous bulk. The minimal bulk height should be 2 cm, if necessary, the amount has to be adjusted accordingly. Then, evacuation may be optionally performed, and a cylindrical striker with a diameter of 16 mm and a height of 120 mm and a weight of 17.5 g (rounded edges) is dropped perpendicularly on to the sample bulk from drop height of 850 mm (minus the bulk height).

Using a suitable method (e.g. video control against mm measure) the deepest spot as well as the absolute rebound height of the striker is determined. The ratio between absolute rebound height in mm and the bulk height in mm, multiplied by 100, is called relative rebound height in the vacuum and is given in percent [%]. It is a measure of the dynamic flexibility. The rebound experiment is performed 20 times each with 5 different and always freshly sieved samples. The value of the relative rebound height (=dynamic flexibility) results then from the maximal calculated value.

Carbon material according to the invention has a relative rebound height of the 10×18 US-mesh (2.00 mm×1.00 mm) sieve fraction, as measured by the downpipe test without vacuum, of at least 20%, preferably at least 50% and especially preferred at least 100%. Measured in the vacuum, the 10×18 US-mesh (2.00 mm×1.00 mm) fraction has a relative rebound height of at least 30%, preferably at least 70% and especially preferred at least 150%.

The 20×40 US-mesh (0.85×0.425 mm) sieve fraction demonstrates a relative rebound height of at least 10%, preferably at least 30% and especially preferred at least 70% without vacuum; in the vacuum 20%, preferably 50%, especially preferably 100%.

Static Flexibility

The static flexibility serves as a further measure of the flexibility of the carbon materials according to the invention. For this, a bulk of 2.5 g of the carbon material (10×18 US-mesh (2.00 mm×1.00 mm) sieve fraction) is provided initially in the downpipe as described above. This bulk is pinned down with a cylindrical aluminium weight of 10 g (diameter 20 mm). Then, an additional weight of 2000 g is applied. Now, the basic height of the bulk is determined at the upper edge of the Al cylinder. After removal of the 2000 g weight, the relaxation height is determined, again at the upper edge of the Al weight, which gives the static flexibility in percent [%] as follows:

Relaxation height [%]=(relaxation height [mm]−basic height [mm])×100/basic height [mm]

Material according to the invention has a static flexibility of the 10×18 US-mesh (2.00 mm×1.00 mm) sieve fraction of at least 1%, preferably 3% and especially preferably 5%, measured as percent relaxation of a bulk of 2.5 g in a cylindrical pipe with a diameter of 21 mm after application of a weight of 2000 g.

To determine the hardness of the carbon material according to the invention, the above described downpipe test is performed 100 times with a 2.5 g sample (10×18 US-mesh (2.00 mm×1.00 mm) sieve fraction), and the sample is then sieved to 50 mesh. The sieve residue in % is the hardness. The 20×40 US-mesh (0.85×0.425 mm) sieve fraction is sieved to a 70 mesh sieve for determination of hardness.

Carbon material according to the invention has a hardness of at least 50% of the 10×18 US-mesh (2.00 mm×1.00 mm) sieve fraction, preferably of at least 80% and especially preferred of at least 90%, measured as sieve residue in % of a 50 mesh sieving after 100 drop experiments in the downpipe. For the 20×40 US-mesh (0.85×0.425 mm) sieve fraction the hardness is at least 50%, preferably of at least 80% and especially preferred at least 90%, measured as sieve residue in % of a 70 mesh sieving after 100 drop experiments in the downpipe.

Furthermore, the carbon material according to the invention has a bulk weight of the 10×18 US-mesh (2.00 mm×1.00 mm) sieve fraction of 0.03–0.6 g/cm$^3$, preferably of 0.1–0.3 g/cm$^3$.

The BET surface of the 10×18 US-mesh (2.00 mm×1.00 mm) sieve fraction of the carbon material according to the invention is at least 10 m$^2$/g, preferably 50 m$^2$/g, and especially preferably at least 100–200 m$^2$/g. BET surfaces, if not otherwise described, are determined according to the method of Brunauer, Emmet and Teller as monomolecular surface occupancy with nitrogen at −196° C. depending on the applied pressure.

Furthermore, the 10×18 US-mesh (2.00 mm×1.00 mm) sieve fraction of the carbon material according to the invention has an iodine number of at least 20 mg/g, preferably 50 mg/g, especially preferred 100 mg/g, determined according to ASTM-D 4607.

Carbon material according to the invention (10×18 US-mesh (2.00 mm×1.00 mm) sieve fraction) furthermore has a CTC value determined according to ASTM-D 3467-76 of at least 5 weight %, as well as a combustion residue of max. 15 weight %, preferably max. 10 weight % after two-hour combustion in presence of oxygen at 1000° C. Furthermore, it has a conductivity of approx. 0.74 Siemens/cm.

Carbon-based material according to the invention has a combustion residue of max. 45 weight % after two-hour combustion in presence of oxygen at 1000° C., whereas ceramic material according to the invention has a combustion residue of at least 90 weight %.

Molecular Sieve Properties

The carbon material according to the invention has molecular sieve properties that are above average compared to conventional charcoal. To determine the molecular sieve properties the oxygen nitrogen break-through experiment is used: for this, 50 g of the carbon material according to the invention (10×18 US-mesh (2.00 mm×1.00 mm) sieve fraction) is provided in a coarse wheel absorber, and evacuated (30 min at p<1 torr). With empty pipe flow rates of approx. 1 cm/s, technical air (20% $O_2$, 80% $N_2$) is passed into the coarse wheel absorber at 20° C. The first 50 ml of the permeating gas amount are isolated through a gas cuvette, and are analysed subsequently for their $N_2$ content.

Carbon material according to the invention (10×18 US-mesh (2.00 mm×1.00 mm) sieve fraction) has $N_2$ content determined in this way of at least 90%, i.e. oxygen is retained with increased selectivity in the carbon material.

The method according to the invention may be integrated advantageously also in the manufacturing process of e complete membrane separation device. The resulting separation device contains the self-supporting, self-rigid membranes according to the invention in a particularly advantageous, compact arrangement.

The membranes according to the invention and the carbon material according to the invention can be used in many ways in the area of fluid separation.

Application examples include:

Separation of oxygen and nitrogen for enrichment of $O_2$ from air, especially as precursor of a zeolithe PSA step (pressure swing adsorption) and/or a perowskite membrane in technically applied air separation methods or in connection with the feeding of enriched $O_2$ for combustion processes, especially, when water is jetted into the combustion chamber for internal cooling.

Separation of hydrocarbon mixtures.

Separation of hydrogen from hydrogen-containing hydrocarbon mixtures, e.g. from petrochemical crack gases, with preferably especially hydrocarbons permeating through the membrane.

Separation of hydrogen from hydrogen-containing hydrocarbon mixtures at noble metal-modified membranes according to the invention, especially with Pt or Pd impregnation, with preferably $H_2$ permeating through the membrane.

General gas filtration.

Waste gas purification, especially the separation of volatile organic compounds (VOC) from waste gas.

Purification of drinking water.

Purification of drinking water, with the membrane being protected from contamination by galvanic methods; especially for molding a capacitive alternating current onto the circuitry to a suitable counter electrode.

Extraction of drinking water.

Desalting or softening of water or sea water.

The invention is illustrated further by means of the following embodiment:

EXAMPLE 1

Membrane Production

In example 1, a paper sheet of approx. 112 mm×233 mm (thickness 0.15 mm) is used containing the fiber substances and additives according to table 1:

TABLE 1

|  | Weight % |
|---|---|
| Linen | 71 |
| Cotton | 13 |
| Charcoal black | 8 |
| Carbon fiber | 8 |
| Total: | 100 |

On a paper sheet with a surface weight of 155 g/cm$^2$, an embossed structure as shown in FIG. 1 is embossed onto one side (permeate side) using a embossing roller. The darkly represented lines in FIG. 1 show grooves that are embossed into the paper level. The "macrochannels" (1) shown in black have a width of approx. 1 mm and a depth of 0.5 mm, and a distance of 2 mm from each other. The perpendicularly arranged "microchannels" (2) have a width of 0.25 mm and are arranged with a distance of 0.25 mm from each other. The longitudinal bands (3) define the folding bridges on which the paper is folded alternately to the front and to the back thereafter. The unembossed transverse bands (4) are arranged on top of each other after the folding, and seal the respective "sheet segments" from each other. For better cohesion after the folding the transverse bands (4) are provided with push-button embossments (5) which alternately protrude into and out from the paper level.

After the embossing the paper is coated with tar pitch powder at the transverse bands (4), and folded along the folding lines (3) on a rotating folding machine and is conditioned in the densest packing.

Figure 2:
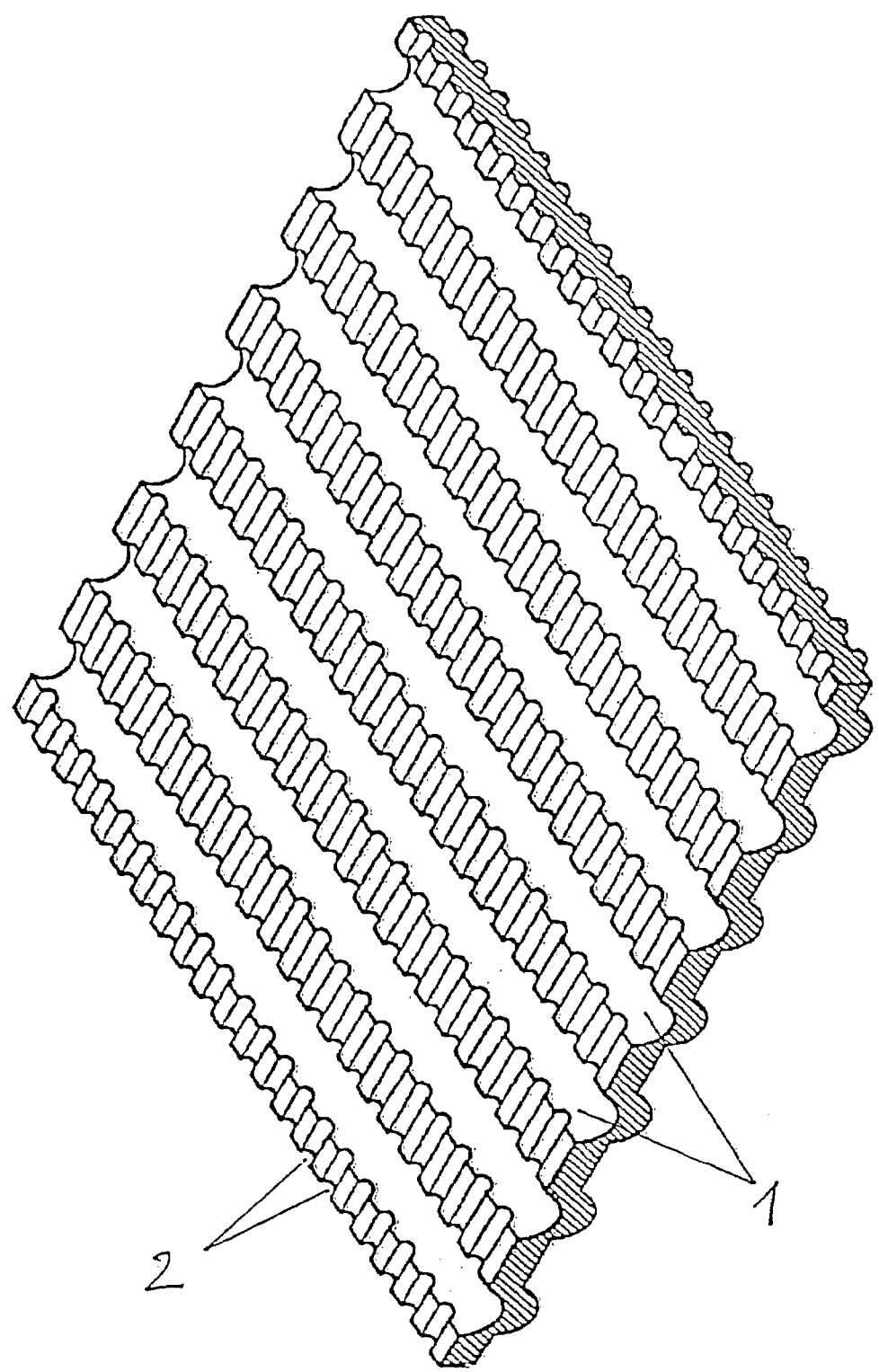
FIG. 2 is a magnified perspective view of a section of the surface of an embossed paper usable according to the present invention

FIG. 2 shows a magnified section of the surface structure of an embossed paper usable according to the invention, with wide macrochannels (1) and narrow, perpendicularly to it arranged microchannels (2).

The so formed paper module was carbonized under nitrogen gas at approx. 200° C. to approx. 600° C. in a closed oven, where a weight decrease of approx. 80% and an average shrinkage of approx. 20% was observed. Then, methane gas (20 vol. % in $N_2$) is suctioned through the carbonized membrane package with a pressure drop of approx. 50 Pa in a closed CVI apparatus between approx. 700° C. and 1300° C. Hereby carbon up to a weight increase of 6 times the carbonized package was deposited. After cooling, a stable, self-rigid membrane with a weight of 4.85 g (starting weight 4 g) and dimensions of 88.0×186.0 mm with a metal-like shining surface was obtained.

EXAMPLE 2

Carbon Material

The membrane from example 1 was mechanically minced with a chopping knife and sieved. The 10×18 US-mesh (2.00 mm×1.00 mm) sieve fraction was used for further characterization of the carbon material. Methods of measurement are used as described above. The carbon material according to the invention demonstrated the properties that are summarized in table 2.

TABLE 2

| Relative rebound height after downpipe test | |
|---|---|
| 10 × 18 US-mesh (2.00 mm × 1.00 mm) (not evacutated) | 150% |
| 10 × 18 US-mesh (2.00 mm × 1.00 mm) (in the vacuum) | 204% |
| 20 × 40 US-mesh (0.85 mm × 0.425 mm) (not evacuated) | 52% |
| 20 × 40 US-mesh (0.85 mm × 0.425 mm) (in the vacuum) | 104% |
| Static flexibility | |
| (10 × 18 US-mesh (2.00 mm × 1.00 mm)) | 4% |
| Bulk weight (10 × 18 US-mesh (2.00 mm × 1.00 mm)) | 0.23 g/cm$^3$ |
| Hardness according to downpipe test (10 × 18 US-mesh (2.00 mm × 1.00 mm), sieve residue of the 50 mesh, sieving after 100 drop tests) | 94% |
| BET surface | 237 m$^2$/g |
| Iodine number | 220 mg/g |
| CTC | 27 weight % |
| $N_2$ content in break-through test | 92.8% |
| Combustion residue (2h, 1000° C.) | 1.3% |

The invention claimed is:

1. A method for production of flexible and porous materials based on oxidic and/or non-oxidic ceramics including carbon, comprising the steps of:
   a) Production of a planar basic matrix the components of which are kept together essentially by hydrogen bonds, on a machine suitable for paper fabrication;
   b) Treating of the basic matrix under pyrolytic conditions at increased temperatures in an atmosphere that is essentially oxygen-free,
characterized by
   the surface of the basic matrix being coated uni- or bilaterally with a polymer film before pyrolysis.

2. The method according to claim 1, characterized by tempering before pyrolysis, if necessary at increased temperatures, and/or treating of the pyrolyzed basic matrix using chemical vapour deposition and/or chemical vapour infiltration (CVD/CVI) after the pyrolysis for deposition of suitable precursors.

3. The method according to claim 2, characterized by $BCl_3$, $NH_3$, a silane, hexadichioromethyl silyloxide (HDMSO), $AlCl_3$, $TiCl_3$ or mixtures thereof being used as ceramic precursors in a CVD and/or CVI treatment.

4. The method according to claim 1 characterized by the basic matrix comprising components that are selected from paper-forming fiber materials, optic fibers, carbon fibers, plastic fibers, carbon nanotubes (single and/or multi wall), fullerenes, metal fibers and powders, asbestos, rock wool fibers, quartz fibers, and powder fillers.

5. The method of claim 4 wherein said powder fillers are selected from the group consisting of carbon black, kaolins, aluminium oxides, silicon oxides, zeolites, charcoal powder, pereskovites, and tar pitch.

6. The method according to claim 1, characterized by the polymer film containing polymeric additives selected from polyethylene, polypropylene, polycarbonate, polyethylene terephthalate, polystyrene, polyamide, polyacrylate, phenol resin, epoxide resin, novolac resin, siloxane, tar pitch, bitumen, rubber-, polychloroprene-, or poly(styrene-co- butadiene)-latex materials and mixtures thereof.

7. The method according to claim 1, characterized by powder, sheet-like or fiber-like material, selected from the group consisting of carbon black, charcoal black, carbon nanotubes (single and/or multi wall), fullerene, carbon fibers, charcoal fibers, charcoal powder, carbon molecular sieve, pereskovites. aluminium oxides, silicon oxides, SiC, BN, noble-metal powder of Pt, Pd, Au or Ag is additionally applied to the basic matrix.

8. The method according to claim 1, characterized by the basic matrix essentially consisting of natural, semisynthetic and/or synthetic fiber substances, and the pyrolysis temperature being selected in such way that after pyrolysis the item has a carbon fraction of more than 50 percent per weight.

9. The method according to claim 8, characterized by the fiber substances being selected from the group of natural fiber substances consisting of cellulose, amylose, starch, polyoses, lignins, flax, hemp, jute, sisal, coco, kenaf, ramie, roselle, sunn, urena, linen, cotton, kapok, fibers from corn straw, alfa or esparto grass, figue, henequen, manila, phormium, bagasse, linters, abaka, and pine fibers.

10. The method according to claim 8, characterized by the fiber substances being selected from the group of semisynthetic fiber substances consisting of cellulose sulfate, cellulose sulfite, cellulose bicarbonate, cellulose derivative esters and ethers, cellulose acetate, alginate, viscose, copper, silk and polyisoprenes.

11. The method according to claim 8, characterized by the fiber substances being selected from the group of synthetic fiber substances consisting of homo- and copolymers of polyacrylonitrile, polyvinyl alcohol, polyethylene, polypropylene, polyamide, polyester, and polyurethane.

12. The method according to claim 1, characterized by basic matrix being embossed before pyrolysis with a structure and the basic matrix then being folded, the individual folds being glued to each other in a suitable maimer to form a compact folds packet.

13. The material producible according to the method according to claim 12, characterized by an average folds distance of less than 15 mm.

14. The method according to claim 1, characterized by a transport pore volume of between 20 and 80 vol. % and/or a median pore diameter between 400 $\mu$m and 5 $\mu$m.

15. A material according to claim 14, characterized by a BET surface of the 10×18 US-mesh (2.00 mm×1.00 mm) sieve fraction of at least 10 m$^2$/g.

16. The material according to claim 14, characterized by an $N_2$ number of at least 90% in the oxygen-nitrogen break-through test.

17. The material according to claim 14 in the form of a ceramics material, characterized by a combustion residue of max. 90 percent per weight after two hour combustion in presence of oxygen at 1,000° C.

18. An adsorbent, membrane and/or membrane carrier comprising a material according to claim 14.

19. A method of using a material according to claim 14, said method comprising at least one step performed in a device with continuous flow-through separation, concentration and/or purification of gases and fluids, wherein said step comprises employing the material for separation of $O_2/N_2$ mixtures, with oxygen being enriched in the permeate;

for separation of hydrogen from $H_2$-containing mixtures, with $H_2$ being enriched in the permeate;

for purification of water;

a filter material for purification of fluids and/or gases;

for enrichment of oxygen in the interior air of interiors; and/or as a catalyst or catalyst carrier.

* * * * *

UNITED STATES PATENT AND TRADEMARK OFFICE
CERTIFICATE OF CORRECTION

| | | |
|---|---|---|
| PATENT NO. | : 7,014,681 B2 | Page 1 of 1 |
| APPLICATION NO. | : 10/399636 | |
| DATED | : March 21, 2006 | |
| INVENTOR(S) | : Andreas Noack et al. | |

It is certified that error appears in the above-identified patent and that said Letters Patent is hereby corrected as shown below:

Column 2, Line 2, delete "crier" and insert --carrier--;

Column 18, Line 13, insert --as-- before "a"

Signed and Sealed this

Twenty-fourth Day of October, 2006

JON W. DUDAS
*Director of the United States Patent and Trademark Office*